(12) United States Patent
Citti et al.

(10) Patent No.: US 9,834,061 B2
(45) Date of Patent: Dec. 5, 2017

(54) ASSEMBLY INCLUDING A HEAT EXCHANGER AND A MOUNTING ON WHICH SAID EXCHANGER IS MOUNTED

(71) Applicant: Valeo Systemes Thermiques, Le Mesnil Saint Denis (FR)

(72) Inventors: Isabelle Citti, Rosnay (FR); Regis Beauvis, Suresnes (FR); Jugurtha Benouali, Clamart (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 174 days.

(21) Appl. No.: 14/375,206

(22) PCT Filed: Jan. 29, 2013

(86) PCT No.: PCT/EP2013/051650
§ 371 (c)(1),
(2) Date: Jul. 29, 2014

(87) PCT Pub. No.: WO2013/113686
PCT Pub. Date: Aug. 8, 2013

(65) Prior Publication Data
US 2015/0040603 A1    Feb. 12, 2015

(30) Foreign Application Priority Data

Jan. 30, 2012   (FR) ...................... 12 50840

(51) Int. Cl.
*B60H 1/00*   (2006.01)
*F28F 9/02*   (2006.01)
(Continued)

(52) U.S. Cl.
CPC ..... *B60H 1/00021* (2013.01); *B60H 1/00328* (2013.01); *B60H 1/00921* (2013.01);
(Continued)

(58) Field of Classification Search
CPC ............ B60H 1/00021; B60H 1/00328; B60H 1/00921; F28D 1/05391; F28D 2021/0084; F28D 2021/0085; F28F 9/0212
See application file for complete search history.

(56) References Cited

U.S. PATENT DOCUMENTS

| | | | |
|---|---|---|---|
| 6,314,750 B1 * | 11/2001 | Ishikawa ............ | B60H 1/00921 62/129 |
| 2002/0007646 A1 * | 1/2002 | Manaka .................. | F25B 39/04 62/506 |

(Continued)

FOREIGN PATENT DOCUMENTS

| | | |
|---|---|---|
| DE | 102 47 609 A1 | 4/2004 |
| EP | 0 887 611 A2 | 12/1998 |

(Continued)

OTHER PUBLICATIONS

International Search Report for Application No. PCT/EP2013/051650 dated Mar. 15, 2013, 5 pages.
(Continued)

Primary Examiner — Emmanuel Duke
(74) Attorney, Agent, or Firm — Howard & Howard Attorneys PLLC

(57) ABSTRACT

The invention relates to an assembly including a heat exchanger and a mounting on which the heat exchanger is mounted. The heat exchanger including a first channel for circulating a coolant supplied by a first collector provided with a first pipe in which the coolant can circulate. The heat exchanger also including a second channel for circulating the coolant supplied by a second collector provided with a second pipe in which the coolant can circulate. The first and second channels define a heat-exchange surface that extends in a substantially vertical plane. The first pipe is located in a lower half of the first collector along a first axis parallel to
(Continued)

the plane of the heat-exchange surface, with the second pipe located above the first pipe along the first axis. The invention further relates to an air-conditioning loop including the above-described assembly.

17 Claims, 2 Drawing Sheets

(51) Int. Cl.
*F28D 1/053* (2006.01)
*F28D 21/00* (2006.01)

(52) U.S. Cl.
CPC ........ F28D 1/05391 (2013.01); F28F 9/0212 (2013.01); *F28D 2021/0084* (2013.01); *F28D 2021/0085* (2013.01)

(56) References Cited

U.S. PATENT DOCUMENTS

| | | | | |
|---|---|---|---|---|
| 2002/0148248 | A1* | 10/2002 | Manaka | F25B 39/04 62/503 |
| 2003/0075305 | A1* | 4/2003 | Sanada | B60H 1/3229 165/67 |
| 2005/0274506 | A1* | 12/2005 | Bhatti | F28D 1/05391 165/177 |
| 2005/0279548 | A1* | 12/2005 | Kurtz, Jr. | B60K 11/04 180/68.6 |
| 2012/0011867 | A1* | 1/2012 | Koons | F25B 39/04 62/115 |

FOREIGN PATENT DOCUMENTS

| | | | |
|---|---|---|---|
| EP | 1 167 910 A2 | 1/2002 | |
| FR | 1 265 756 A | 6/1961 | |
| FR | 2 958 019 A1 | 9/2011 | |
| GB | 913270 | * 12/1962 | |
| GB | 913270 A | * 12/1962 | ......... B60H 1/00328 |

OTHER PUBLICATIONS

English language abstract and machine-assisted English translation for DE 102 47 609 extracted from espacenet.com database on Sep. 11, 2014, 23 pages.

Machine-Assisted English translation for FR 1 265 756 extracted from the espacenet.com database on Sep. 11, 2014, 4 pages.

English language abstract and machine-assisted English translation for FR 2 958 019 extracted from espacenet.com database on Sep. 11, 2014, 45 pages.

* cited by examiner

ASSEMBLY INCLUDING A HEAT EXCHANGER AND A MOUNTING ON WHICH SAID EXCHANGER IS MOUNTED

RELATED APPLICATIONS

This application is the National Stage of International Patent Application No. PCT/EP2013/051650, filed on Jan. 29, 2013, which claims priority to and all the advantages of French Patent Application No. 12/50840, filed on Jan. 30, 2012, the content of which is incorporated herein by reference.

The invention relates to the field of heat exchangers, for example heat exchangers suitable for operating with a reversible air conditioning circuit intended in particular to heat or to cool the passenger compartment of a vehicle.

In vehicles comprising a combustion engine, the comfort thermal is ensured, on the one hand, for the heating requirements, by the use of the heat of the engine and, on the other hand, for the cooling requirements, by a system of conditioned air operating with a mechanical compressor.

On the other hand, for electric vehicles, it is not possible to use the heat released by the heat engine, the only source of energy available inside the vehicle being electrical energy. It is therefore this electrical energy which is used in order to meet the heating and cooling requirements in the passenger compartment.

Thus it is known to ensure thermal comfort in electric vehicles by a conventional air conditioning system operating with an electrical compressor for the cooling requirements and by an electric radiator for the heating requirements. However, such radiators consume a considerable amount of electrical energy and, for the purpose of increasing the autonomy of electric vehicles, it is advantageous to produce thermal energy, for heating and cooling, by means of a single air conditioning system having a greater efficiency.

For this it is known to use reversible air conditioning circuits, that is to say circuits which are capable of cooling and heating the passenger compartment of the vehicle. In fact these reversible air conditioning circuits consume less electricity than the radiators and the conventional air conditioning systems with equal thermal performance levels.

Thus, the air conditioning loops in which these heat exchangers are disposed are arranged in order to operate in two distinct modes, the first, so-called "cooling" mode makes it possible to cool the passenger compartment and the second, so-called "heating" mode makes it possible to heat the passenger compartment. A heat exchanger of the air conditioning loop, situated at the front of the vehicle, is then made to operate alternately as a condenser in "cooling" mode, and as an evaporator in the "heating" mode.

The front exchangers used in the air conditioning loop are generally optimised for one single and unique mode of operation: the "cooling" mode.

However, this type of heat exchanger is not optimised for the "heating" mode. The consequences of this lack of optimisation are that for a heat exchanger, the entire surface for exchange with the air stream is used for the exchange of heat in the "cooling" mode, but almost 30% of this surface is not so used in the "heating" mode. Moreover, the internal pressure loss is not adapted to a mode of operation in the "heating" mode, these pressure losses involving mechanical forces which are too great for the compressor.

Therefore the invention seeks to improve the situation.

For this purpose the invention proposes an assembly including a heat exchanger and a support on which said exchanger is mounted, said exchanger including a first channel for circulating a coolant fluid supplied by a first collector provided with a first pipe through which the coolant fluid can circulate, and a second channel for circulating the coolant fluid supplied by a second collector provided with a second pipe through which the coolant fluid can circulate, the first and second channels defining a heat exchange surface which extends in a substantially vertical plane, characterised in that the first pipe is located in the lower half of the first collector along an axis parallel to the plane of the heat-exchange surface, referred to as the first axis, the second pipe being located above the first pipe along the first axis.

By virtue of the invention, when the heat exchanger operates in heating mode, that is to say as an evaporator, the refrigerant fluid can enter the exchanger by the first pipe which is situated below the second pipe, before running through the first channel and then the second channel which is situated above the first channel, in order finally to leave the heat exchanger in the region of the second pipe. During its transit in the heat exchanger, the coolant fluid is heated and evaporates, and as the gas is lighter than the liquid it has a tendency to rise in relation to liquid, thus following the direction of circulation of the coolant fluid in the exchanger between the two channels, that is to say in this case from bottom to top. Thus the circulation of the coolant fluid is homogenised in the two channels of the exchanger, the gas helping to better distribute the liquid in the second channel. In cooling mode, that is to say when the exchanger operates as a condenser, the coolant fluid likewise enters from the bottom. However, it is in the form of a gas and rises in the second channel in a two-phase state, that is to say in a liquid part and a gaseous part. This direction of circulation causes little or no disruption to the efficiency of the condenser with respect to its known mode of operation which is to circulate in the reverse direction in the exchanger, that is to say to enter by the top of the exchanger and to leave by the bottom thereof. When the exchanger operates in condenser mode, the circulation of the coolant fluid from the bottom towards the top has no adverse effect on the efficiency of the condenser. In this mode of operation, the mass flow rate of coolant fluid is higher than in evaporator mode, for example of the order of two to three times higher. This results in a lesser effect or even no effect of the gravity of coolant fluid on the efficiency of the condenser.

Thus the invention makes it possible to improve the uniformity, that is to say the homogeneity and the regularity, of the flow of the fluid inside the heat exchanger. It also makes it possible to achieve a good compromise by considerably improving the thermal performance levels in evaporator mode, that is to say in "heating" mode, whilst limiting the deterioration of thermal performance levels in condenser mode, that is to say in "cooling" mode.

Also advantageously, the first pipe is situated in a lower quarter of the first collector along the vertical axis.

Advantageously, the first and the second pipes are aligned on the first axis.

A substantially vertical plane will be understood here as a plane defining an angle less than 15 degrees with respect to the vertical, on one or the other side of a vertical plane. The heat exchanger is in particular situated at the front of a motor vehicle. In other words, the heat exchanger is situated on a part of the support situated at the front of the vehicle.

According to an aspect of the invention, the number of channels for circulating the coolant fluid is specifically equal to two. Thus the invention makes it possible to reduce the pressure loss to which the coolant fluid is subjected during its passage in the exchanger in evaporator mode without impairing the thermal performance levels too much in condenser mode.

According to a particular embodiment of the invention, the second pipe is situated in the lower half of the second collector along the first axis. Advantageously, the second pipe is situated in a lower quarter of the second collector along this first axis. As the second pipe is situated in a low part of the second collector along this first axis, the coolant fluid pulled by gravity towards the low part of the second collector can leave the exchanger by the second pipe more easily, the internal pressure losses thus being limited. Such an arrangement of the pipes relative to the parts of the collector makes it possible to easily evacuate the oil present in the coolant fluid. Thus the effect of gravity on the oil tends to displace the oil towards the bottom of the parts of the collector, which reduces any risk of retention of the oil in the exchanger.

According to one embodiment of the invention, the first channel occupies less than 50% of said exchange surface. Advantageously, the first channel occupies substantially 30% of said exchange surface.

According to an aspect of the invention, the first collector and the second collector define one and the same collector box.

In a particular form of the invention, said support is a body or a chassis of a motor vehicle.

According to an alternative, said support is a heat exchanger module. The heat exchanger module is mounted for example on a body or a chassis of a motor vehicle.

The object of the invention is therefore to combine the rules for arrangement of the inlet/outlet pipes, of the direction of the coolant fluid, and of the distribution of the channels which have the optimum performance in order to be used as an evaporator and as a condenser.

The invention also relates to an air conditioning loop capable of operating in a first so-called cooling mode of a passenger compartment of a vehicle and in a second so-called heating mode of the passenger compartment of a vehicle, said air conditioning loop being traversed by a coolant fluid and comprising an interior heat exchanger operating as an evaporator, a compressor, an expansion element and an assembly as described previously.

According to a preferred variant of the invention, the coolant fluid enters by the first pipe both in heating mode and in cooling mode.

Alternatively, the coolant fluid enters by the first pipe in heating mode and by the second pipe in cooling mode.

Other characteristics, details and advantages of the invention will become clearer upon reading of the description given below by way of illustration in relation to the drawings, in which.

Figure 1:
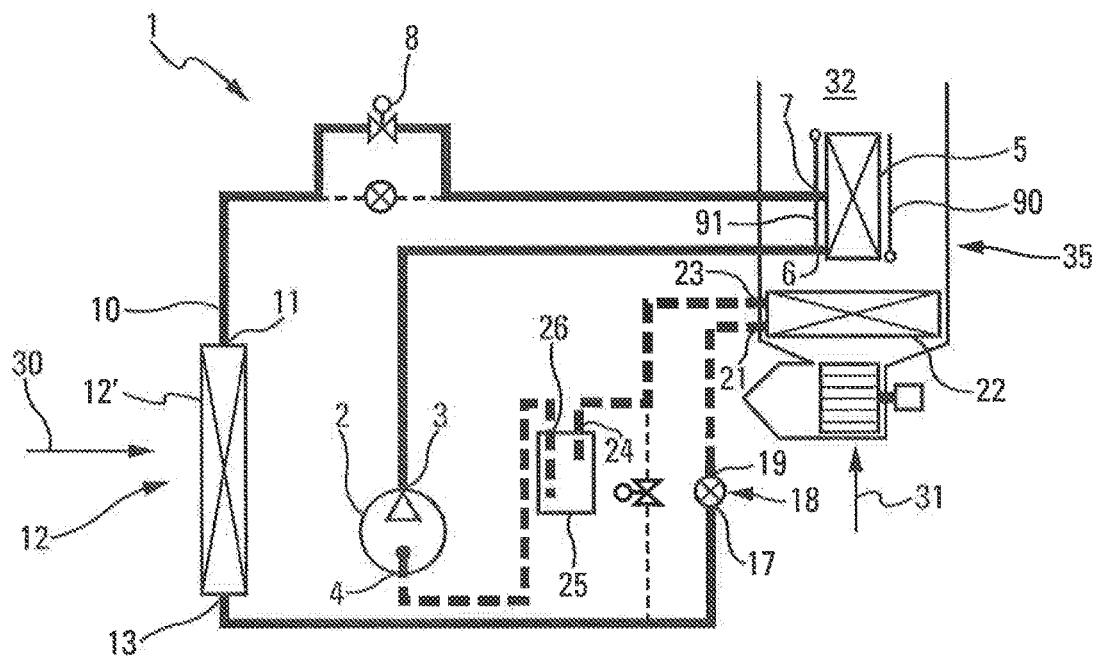
FIG. 1 shows a schematic plan view of an air conditioning loop in cooling mode comprising an exchanger according to the invention.

FIG. 1 shows an air conditioning loop 1 of a vehicle according to the invention operating in cooling mode. Such a loop 1 comprises conduits 10 defining a circuit inside which a coolant fluid, also referred to as a refrigerant fluid, circulates. The loop 1 comprises a compressor 2, in particular an electrical compressor, of which the function is to put the coolant fluid in circulation within the circuit. The compressor 2 compresses and raises the temperature of the coolant fluid which is then in gaseous form.

An outlet 3 of the compressor is connected to an inlet 6 of a first heat exchanger 5. Such a first heat exchanger 5 is an interior exchanger in this sense that it modifies the temperature of an air stream 31 sent into the passenger compartment of a vehicle. In cooling mode, the first exchanger 5 does exchange heat with other fluids and serves only as a conduit for circulation of the coolant fluid. Thus it is isolated from the air stream 31 by means of two shutters 90 and 91 which prevent the exchange body of this first exchanger from being traversed by this air stream. An outlet 7 of the first exchanger is connected, still in cooling mode, to a first valve 8, in particular a two-way valve, which enables it to be connected directly to an inlet 11 of a second heat exchanger 12. This second exchanger 12 is arranged on the vehicle, for example in the region of the front thereof. The invention relates in particular to the second exchanger 12. The second exchanger 12 operates here as a condenser 12'. The function of said exchanger is to produce a heat exchange between an exterior air stream 30 which passes through it and the coolant fluid which circulates in the condenser 12'. Thus condensation and a first cooling of the coolant fluid is ensured.

An outlet 13 of the second heat exchanger 12 is, still in the passenger compartment cooling mode, connected to an inlet 17 of a first expansion means 18. The expansion means 18 has the function of reducing the pressure of the coolant fluid during the implementation of the thermodynamic cycle which takes place in the circuit. This expansion means 18 is for example an orifice with a fixed cross-section, a thermostatically controlled expansion valve or else an electronically controlled expansion valve.

An outlet 19 of the expansion means 18 is connected to an inlet 21 of a third heat exchanger 22, in this case an evaporator, intended for cooling an interior air stream 31 which passes through it, by heat exchange with the coolant fluid. The interior air stream 31 is the air stream which is sent into the passenger compartment 32 with a view to cooling said compartment. The third heat exchanger 22 is mounted in a ventilation, heating and/or air conditioning installation represented symbolically by the reference numeral 35. In passing through this third exchanger 22, the coolant fluid takes up the calories present in the interior air stream 31 and is therefore heated thereby. It will be noted that the first heat exchanger 5 is likewise installed inside the ventilation, heating and/or air conditioning installation 35, in particular downstream of the third heat exchanger 22 in the direction of movement of the interior air stream 31.

An outlet 23 of the third heat exchanger 22 is connected to an inlet 24 of a storage device 25. This is an accumulator which can separate the liquid and gaseous parts of the coolant fluid in order to protect the compressor by supplying it solely with a coolant fluid in the gaseous state. An outlet 26 of the storage device 25 is connected to the inlet 4 of the compressor 3 and the air conditioning loop is returned to its starting point.

Figure 2:
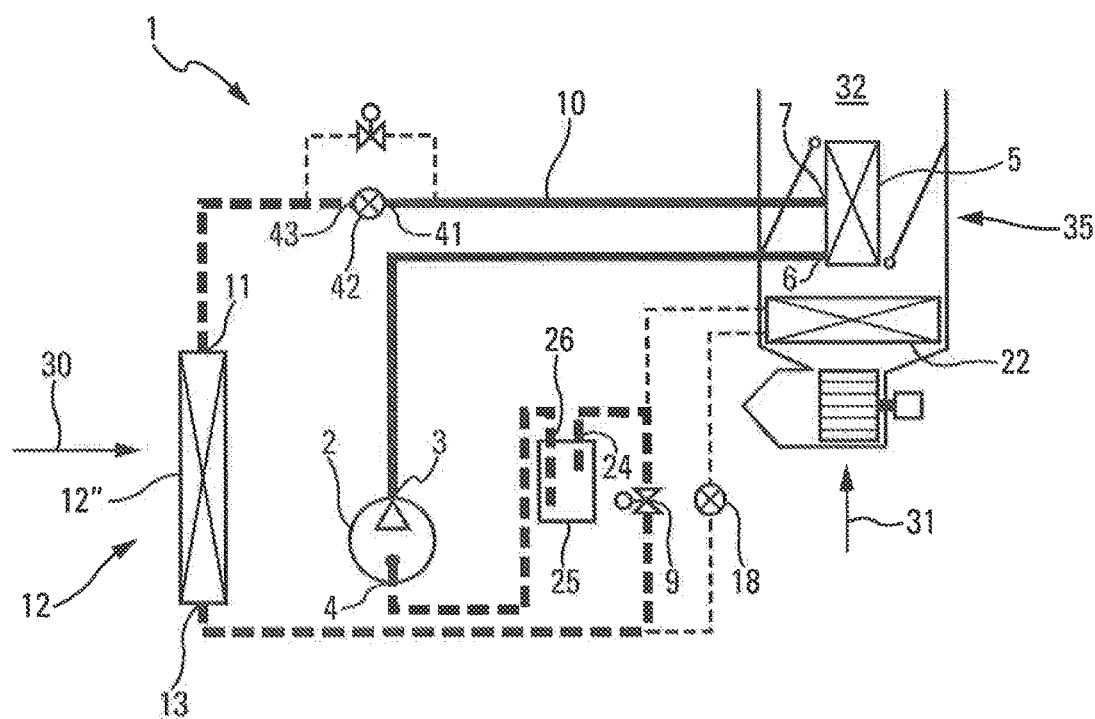
FIG. 2 shows a schematic plan view of the air conditioning loop illustrated in FIG. 1 but operating in heating mode and FIG. 3 shows a schematic plan view of the heat exchanger according to the invention.

FIG. 2 describes the same air conditioning loop as that described in FIG. 1 but operating in heating mode. According to this mode of operation, the coolant fluid comes out of the compressor 3 and enters the first exchanger 5 mounted in the ventilation, heating and/or air conditioning installation 35. The coolant fluid then exchanges heat with the interior air stream 31. The function of the first exchanger 5 is in this case to dissipate the calories present in the coolant fluid in the interior air stream 31 which can thus be heated and enable the heating of the passenger compartment 32 of the vehicle. In the course of this step, the coolant fluid is therefore cooled.

In heating mode the first valve 8 is closed and the outlet 7 of the first exchanger is directly connected to an inlet 41 of a second expansion means 42 for example identical to the first expansion means 18 and fulfilling the same function as said first expansion means. The second expansion means 42 therefore lowers the pressure of the coolant fluid and an outlet 43 of the second expansion means 42 is connected to the inlet 11 of the second exchanger 12. The exterior air stream 30 passing through the second exchanger 12 heats the coolant fluid passing inside the second exchanger. The second exchanger 12 in this case is an evaporator 12".

The coolant fluid is then directed directly towards the inlet 24 of the storage means 25 via a second valve 9, in particular a two-way valve. Therefore in this case the coolant fluid does not pass through the third exchanger 22.

The coolant fluid next comes out of the storage means 25 before entering the compressor 2 through its inlet 4 as seen previously.

Thus the ventilation, heating and/or air conditioning installation operates in at least a heating mode and/or a cooling mode. On the other hand, the coolant fluid circulates in one and the same direction in the circuit during the implementation of these two modes.

Figure 3:
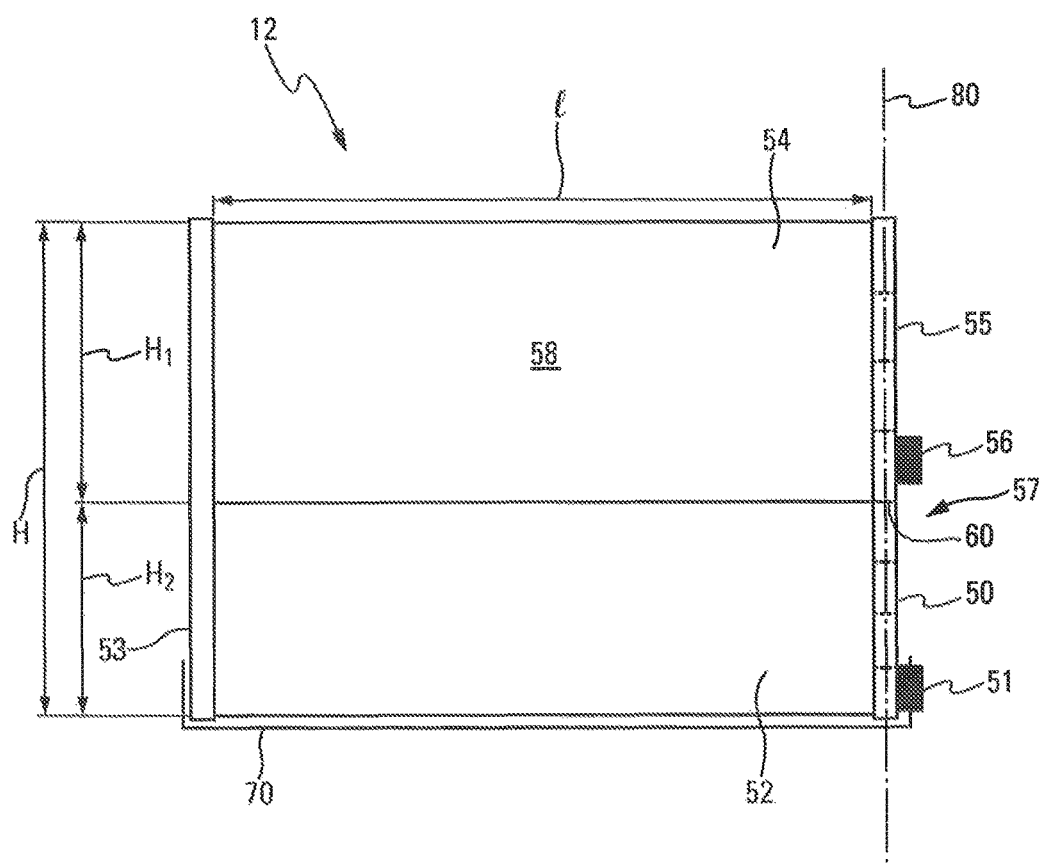

FIG. 3 represents a heat exchanger according to the invention, in particular situated at the front of the vehicle, that is to say the second exchanger 12 of FIGS. 1 and 2. This second heat exchanger 12 is in particular mounted on a support 70, the second exchanger 12 and the support 70 forming an assembly according to the invention.

Such a second exchanger 12 comprises an inlet collector, referred to as a first collector 50, intended to collect the coolant fluid at the inlet of the second exchanger 12 and to distribute it in a bundle forming part of the heat exchanger according to the invention. This first collector 50 is provided with a first pipe 51 which connects the second exchanger 12 to the circuit for circulation of the coolant fluid, in particular to the conduits provided with reference numeral 10 on FIG. 1. The coolant fluid therefore enters the second exchanger 12 by the first pipe 51, then it penetrates into the first collector 50 which distributes it in a first channel 52 for circulation of the coolant fluid included in the second exchanger 12.

The first channel 52 opens via a first longitudinal end, situated on the right on FIG. 3, into the first collector 50 and via a second longitudinal end, situated on the left on FIG. 3, into a second collector box 53. The coolant fluid can then be collected by the second collector box 53 and can be distributed, also by the second collector box 53, into a second channel 54 for circulation of the coolant fluid. The second channel 54 is situated above the first channel 52 in a substantially vertical plane.

Advantageously, such a plane may be absolutely vertical.

The first channel 52 and the second channel 54 extend in one and the same plane, referred to as a substantially vertical plane. Together they define a surface 58 for heat exchange with the exterior air stream, this exchange surface extending in the substantially vertical plane. The second channel 54 opens via a second longitudinal end, situated on the left on FIG. 3, into the second collector box 53 and via a first longitudinal end, situated on the right on FIG. 3, into a fluid outlet collector referred to as a second collector 55.

The second collector 55 collects the coolant fluid arriving from the second channel 54. In the same way as the first collector 50, the second collector is equipped with an outlet pipe, referred to as a second pipe 56. This time the second pipe 56 enables the coolant fluid to leave the second exchanger 12 and to continue its transit in the air conditioning loop as described previously. It will be understood that the second exchanger 12 in this case comprises solely two channels for circulation of the coolant fluid: the first and the second channels, provided with reference numerals 52, 54 respectively.

The second collector 55 is located above the first collector 50 according to an axis parallel to the substantially vertical plane, referred to as the first axis 80. When the plane is vertical the axis is likewise vertical.

The first axis is advantageously comprised in the substantially vertical plane. The first and the second collectors 50, 55 are situated on this first axis 80. Thus the first and the second collector form one and the same collector box, referred to as the first collector box 57, that is to say one single collector box. A partition 60 which is impermeable to the coolant fluid separates the first collector 50 from the second collector 55.

The first and the second channels 52, 54 comprise for example a bundle of parallel tubes (not shown) of which the ends are connected, in a fixed and sealed manner, on the one hand to the first collector 50 in the case of the first channel 52 and to the second collector in the case of the second channel 54, and on the other hand to the second collector box 53. In particular, the tubes in which the coolant fluid circulates have an oblong transverse cross-section and between them are arranged spacers which increase the efficiency of heat exchange between the coolant fluid circulating in the second exchanger 12 and the exterior air stream passing through said exchanger in a direction substantially perpendicular to the substantially vertical plane. Thus the first and second channels 52, 54 define the exchange surface 58 which extends in the substantially vertical plane. The interior of the tubes may also include disturbers which, like the spacers, increase the efficiency of the heat exchange and the mechanical stability of the tubes. They may also be extruded tubes. In this case, each tube defines for example a plurality of parallel internal channels for circulation of fluid.

According to the invention, the first pipe 51 is located in a lower half of the first collector 50 along the first axis 80, and in particular in a lower quarter of the first collector 50 along the first axis 80. Thus the coolant fluid enters the second exchanger 12 by a lower part of the first collector 50 according along the first axis 80.

The second pipe 56 is located according to the invention in a lower half of the second collector 55 along the first axis 80, and in particular in a lower quarter of the second collector along the first axis. Thus the coolant fluid leaves the second exchanger 12 by a lower part of the second collector 55 along the first axis 80. Thus this configuration is particularly advantageous in order to enable the optimisation of the evacuation of a liquid phase of the cooling fluid, in cooling mode or in heating mode. The fact of having the pipes 51 and 56 at the bottom of each collector 50 or 55 makes it possible to evacuate the oil easily since it will tend by gravity to circulate at the bottom of the collectors, thus reducing any risk of retention in the exchanger.

The height of the first channel 52 is referred to as H1, the height of the second channel 58 is referred to as H2 and the height of the exchange surface 58, equal in this case to the sum of H1 and H2, is referred to as H. The height H1 of the first channel 52, the height H2 of the second channel 54 and the height H of the exchange surface 58 are measured parallel to the substantially vertical plane. The first and second channels 52, 54 have the same width I, measured perpendicular to the heights H1, H2, H and in the substantially vertical plane. The exchange surface 58 is therefore equal to the product of the height H of the exchange surface 58 times the width I. The first channel 52 defines a first exchange surface equal to the product of the height H1 of the first channel 52 times the width I. The second channel 54 defines a second exchange surface equal to the product of the height H2 of the second channel 52 times the width I.

According to the invention, the first channel occupies less than 50% of the exchange surface 58. As the first and the second channel 52, 54 are characterised by the same width I, the height H1 of the first channel 52 is therefore smaller than the height H2 of the second channel 54, that is to say that it is smaller than half the height H of the exchange surface 58.

The first channel 52 occupies in particular substantially 50% of the exchange surface 58. In other words, the height H1 of the first channel 52 represents in particular substantially 30% of the height H of the total exchange surface 58. In this case the height H2 of the second channel 54 represents substantially 70% of the height H of the total exchange surface 58.

As the tubes are identical and spaced apart from one another by the same distance according to the height H of the total exchange surface 58, the first channel 52 comprises less than 50% of the total number of tubes of the second exchanger 12, and in particular substantially 30%.

The support 70 is for example a body or a chassis of the motor vehicle in which the air conditioning loop and therefore the second exchanger 12 is installed.

Alternatively, the support 70 is a module of heat exchangers. In this case, the module of heat exchangers is mounted on a body or a chassis of the vehicle and it is intended to receive exclusively the second exchanger 12 of the invention, or a plurality of heat exchangers which includes the second heat exchanger 12. The support 70 is in particular a U-shaped part, in the interior of which the second exchanger 12 is accommodated. It will be understood here that the first collector box 57 is accommodated against a first lateral branch of the module 70, that is to say a first lateral branch of the U, the second collector box 53 is accommodated against a second lateral branch of the module, that is to say a second lateral branch of the U, and that a lower part of the second exchanger 12 in relation to the first axis 80 is accommodated against a central branch of the module 70, that is to say a central branch of the U.

The invention claimed is:

1. An assembly comprising a heat exchanger (12) and a support (70) on which the heat exchanger (12) is mounted, with the exchanger (12) comprising:
    a first channel (52) for circulating a coolant fluid supplied by a first collector (50) provided with a first pipe (51) through which the coolant fluid can circulate, and
    a second channel (54) for circulating the coolant fluid supplied by a second collector (55) provided with a second pipe (56) through which the coolant fluid can circulate,
    wherein the first and second channels (52, 54) define a heat exchange surface (58) which extends in a substantially vertical plane,
    wherein the first pipe (51) is located in a lower half of the first collector (50) along a first axis (80) parallel to the vertical plane of the heat exchange surface, with the second pipe (56) located above the first pipe (51) along the first axis (80), and
    wherein the second pipe (56) is located in a lower half of the second collector (55) along the first axis (80).

2. The assembly according to claim 1, wherein the number of channels (52, 54) for circulating the coolant fluid is exclusively equal to two.

3. The assembly according to claim 2, wherein the first pipe (51) is located in a lower quarter of the first collector (50) along the first axis (80).

4. The assembly according to claim 1, wherein the first pipe (51) is located in a lower quarter of the first collector (50) along the first axis (80).

5. The assembly according to claim 4, wherein the second pipe (56) is located in a lower quarter of the second collector (55) along the first axis (80).

6. The assembly according to claim 1, wherein the second pipe (56) is located in a lower quarter of the second collector (55) along the first axis (80).

7. The assembly according to claim 6, wherein the first channel (52) occupies less than 50% of the exchange surface (58).

8. The assembly according to claim 1, wherein the first channel (52) occupies less than 50% of the exchange surface (58).

9. The assembly according to claim 8, wherein the first channel (52) occupies substantially 30% of the exchange surface (58).

10. The assembly according to claim 1, wherein the first collector (50) and the second collector (55) define a collector box (57).

11. The assembly according to claim 1, wherein the support (70) is a body or a chassis of a motor vehicle.

12. The assembly according to claim 1, wherein the support (70) is a module of heat exchangers.

13. An air conditioning loop (1) capable of operating in a first cooling mode of a passenger compartment (32) of a vehicle and in a second heating mode of the passenger compartment (32) of the vehicle, with the air conditioning loop (1) being traversed by a coolant fluid and comprising at least one evaporator, a compressor, an expansion element and the assembly according to claim 1.

14. The air conditioning loop according to claim 13, wherein the coolant fluid enters by the first pipe both in the heating mode and in the cooling mode.

15. The air conditioning loop according to claim 13, wherein the coolant fluid enters by the first pipe in the heating mode and by the second pipe in the cooling mode.

16. The assembly according to claim 1, wherein the coolant fluid enters the heat exchanger through the first pipe (51) and exits the heat exchanger through the second pipe (56).

17. An assembly comprising a heat exchanger (12) and a support (70) on which the heat exchanger (12) is mounted, with the exchanger (12) comprising:
    a first channel (52) for circulating a coolant fluid supplied by a first collector (50) provided with a first pipe (51) through which the coolant fluid can circulate, and
    a second channel (54) for circulating the coolant fluid supplied by a second collector (55) provided with a second pipe (56) through which the coolant fluid can circulate,
    wherein the first and second channels (52, 54) define a heat exchange surface (58) which extends in a substantially vertical plane,
    wherein the first pipe (51) is located in a lower half of the first collector (50) along a first axis (80) parallel to the vertical plane of the heat exchange surface, with the second pipe (56) located above the first pipe (51) along the first axis (80), wherein the second pipe (56) is located in a lower half of the second collector (55) along the first axis (80), wherein the number of channels (52, 54) for circulating the coolant fluid is exclusively equal to two, and wherein the first channel (52) occupies substantially 30% of the exchange surface (58).

\* \* \* \* \*